Aug. 2, 1966  K. A. TOROSSIAN  3,263,308
PROCESS FOR GROUND INSULATING A CONDUCTOR
BAR FOR ELECTRODYNAMIC MACHINES
Filed May 31, 1962
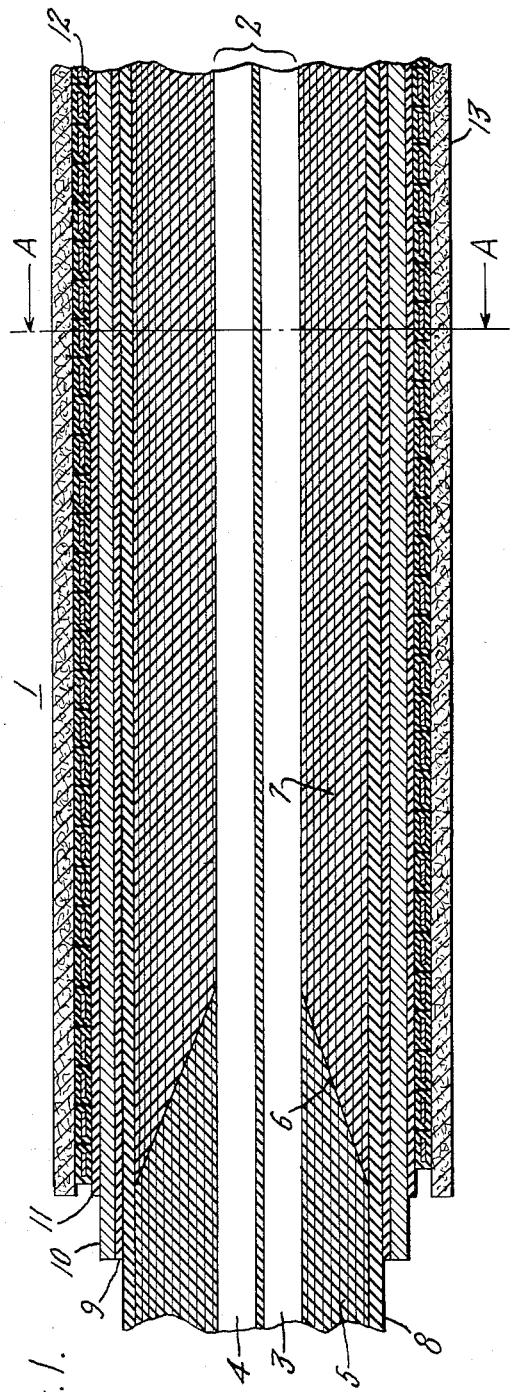
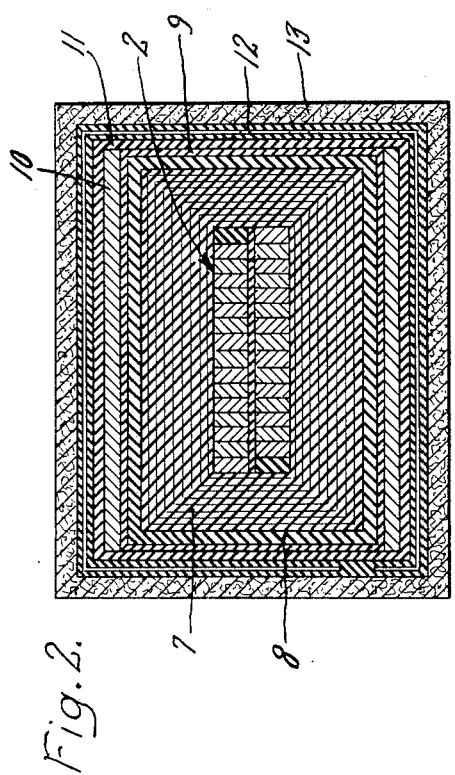
Inventor
Kevork A. Torossian
by
His Attorney United States Patent Office 3,263,308
Patented August 2, 1966

3,263,308
PROCESS FOR GROUND INSULATING A CONDUCTOR BAR FOR ELECTRODYNAMIC MACHINES
Kevork A. Torossian, Ballston Lake, N.Y., assignor to General Electric Company, a corporation of New York
Filed May 31, 1962, Ser. No. 198,995
11 Claims. (Cl. 29—155.5)

This invention relates to the insulation of electrical windings for electrodynamic machines. More particularly, it relates to the fabrication of thermoset ground insulation for electrical conductor bars which are especially adapted as replacement bars for already-wound machines which permit ready and precise fitting of the bar in the machine without damaging the insulation thereon.

Conductor bars for electrodynamic machines are generally constructed of a plurality of conductor turns insulated from each other by a suitable dielectric material with an outer covering of ground insulation around the entire bar. When originally constructing a large machine of this type, the bars are usually prefabricated with a straight slot portion and curved arm or end portions and fully insulated, the end portions being further bent as necessary during actual construction of the machine so that electrical connections may be made with the mating bar. While there is some danger, even in original construction, of cracking the ground insulation when so constructing a machine, this danger is somewhat alleviated by using suitable ground insulation which may be flexibilized as by heating or other means during assembly. Such a suitable ground insulation is described, for example, in Patent 2,707,204, assigned to the same assignee as this invention. The greatest danger from cracking such ground insulation during assembly of the machine occurs when the last several bars are inserted in place in the stator of such a machine, since at this point, there is very little room for bending or maneuvering the bar arms. For example, in a large electrodynamic machine, the distance between the conductor bar arms may be as little as one-half inch to one inch. It will be appreciated that when individual failed conductor bars are to be replaced in an already-wound machine, and particularly when this is done in a power station or in the field rather than in the factory, the difficulty of inserting replacement bars without damage is particularly great.

Various proposals have been made for readily insulating the arm or end portions of conductor bars which will allow for the flexibility necessary in assembly. It has been suggested, for example, that the slot portions be separately cured in the usual manner as under heating and pressure to produce an insulation of good dielectric characteristics and that the ends or arms be insulated with an uncompressed heat-cured insulation which is usually of greater build or wall thickness in order to achieve dielectric characteristics commensurate with those of the slot portion. This procedure requires an excessive amount of material and, even if it is possible to fit the bulky arms in the machine, makes for a crowded structure which may lead to excessive heat generation in the end windings in a small space which is even further constricted by the bulky end structure itself. This is aside from the point that the end portions so insulated are unworkmanlike in appearance and, at best, provide a poor substitute.

A principal object, therefore, of this invention is to provide a method for fabricating electrical conductor bars for electrodynamic machines and particularly as replacement bars for such machines which are readily inserted in place in the field. While the invention is described with relation to conductor bars or half-coils which are connected after installation in a machine to provide full coils therein, it includes also the fabrication of full coils.

Briefly, the invention comprises the fabrication of electrical conductor bars wherein the slot portion and a part of the arm or end portion of the bar is insulated in the usual manner with a resin-impregnated insulation which is heat and pressure cured to high dielectric and mechanical characteristics. The arm of the bar is then insulated with a plurality of layers of solventless resin-impregnated tape, the arm ground insulation being compressed by the application thereto of wrappings of shrinkable tape material, heating to effectively compact the arm insulation, placing in the machine, heating the arm insulation to flexibilize the arm for installation and heating to curing temperature to achieve dielectric characteristics comparable to that of the slot ground insulation.

Those features of the invention which are believed to be novel are set forth with particularity in the claims appended hereto. The invention will, however, be better understood from a consideration of the following description and the drawing in which FIGURE 1 is a cross-sectional longitudinal view of a portion of a conductor bar arm illustrating the invention and FIGURE 2 is a cross-sectional view taken in the direction A—A of FIGURE 1.

While any ground insulation can be used for the slot portion of the conductor bar, it is preferred to use materials such as those set forth in Patent 2,707,204 mentioned above, assigned to the same assignee as the present invention, this patent being incorporated herein by reference. With the slot ground insulation prepared and cured, the arm portion of the ground insulation is scarfed for a distance depending upon the size of the bar, ranging typically from about three to six or more inches. The scarfed area of the slot insulation and the bare arm portion of the bar are then preferably primed with a resin composition similar to that used in the arm ground insulation, although this primer layer can be omitted. The ground insulation for the arm portion is typically in the form of a sheet or tape as of mica flake, mica mat, and the like, such materials being well-known to those skilled in the art. Preferably, the tape is impregnated with a solventless insulation such as that described, for example, in Patent 2,962,410, assigned to the same assignee as the present invention. The resin impregnated tape is wrapped tightly around the arm portion of the conductor bar except for an end electrical contact region, care being taken to conform the layers of tape to the scarfing with the outer-most layer of tape overlapping slightly the slot insulation when it has reached the same thickness as said slot insulation. Where full coils are to be so insulated only the usual contact portion of such coils is left bare. Next, there is placed over the tape so laid down and over the adjoining part of the slot insulation a layer of non-adherent material such as of fluorocarbon or polychlorofluoroethylene materials or equivalent. This non-adherent layer facilitates removal of all material down to the ground insulation. In some cases, as mentioned below, it can be omitted. Over the non-adherent layer, there are placed at least two tightly-wrapped and half-lapped layers of shrinkable material which shrinks at least about five per cent of its length at a temperature of about 120° C. or higher. Among such materials is the post-oriented polyethylene terephthalate described in Patent 2,993,820, assigned to the same assignee as this invention. This polyethylene terephthalate material is an oriented film which is prepared by drawing the film biaxially as it comes from the melt and held in a stretched configuration while the molecular orientation is set, usually at a temperature of about 220° C. It has been found that when such material is heated through the range of about 25° C. to 150° C., there is a low order of recovery, the tensile recovery force decreasing with increase in temperature so that the recovery force averages about 700 to 750 p.s.i. through the temperature range of 25° C. to 150° C. According to the last-mentioned patent, when this oriented polyethylene terephthalate is additionally uniaxially stretched or post-oriented in the range of three percent to twenty-four percent at room or elevated temperatures and thereafter heated in the range of 25° C. to 150° C. for one-half to one hour or more, there will be a recovery of substantially all of the post-oriented elongation which, when the material is restrained in the stretched or stressed condition at the heating temperature, exerts a particularly high restoring force which is far and away greater than that of material which is not so post-oriented. Other materials besides polyethylene terephthalate can be used. Among such other materials are polyvinylfluoroethylene, known as Tedlar, manufactured by E. I. du Pont de Nemours and Company. Other materials which can be so post-oriented will occur to those skilled in the art. Over the layer of shrinkable material in one embodiment there is placed along each side of the ground insulation of rectangular bars a rigid metal plate or pressure applying and distributing means as of steel, iron, aluminum, copper, and the like, which conforms to the configuration of the arm. This plate can be flat or rounded on one side with the flat side placed next to the bar. The function of this metal plate is to distribute later applied pressure afforded by the overlayer of shrinkable material evenly over the conductor bar insulation and also to distribute evenly the heat applied thereto. The metal plates are held in place with superimposed layers of the shrinkable material described above, the number of layers of such material being tailored to the pressure desired. It has been found, for example, that for bars up to three inches high, five layers of half-lapped 0.002 inch tape are sufficient with three extra layers of tape being used for each additional one-half inch of bar height. This equalization of the pressure afforded by the metal plates in the case of rectangular conductor bars maintains the shape of the bar and prevents migration of the resin in the ground insulation tape from the corners of the bar. Any desired heat source capable of uniformly applying heat is used. It has been found convenient, for example, to wrap over the outer layer of shrinkable material a butt-joined layer of heating tape which is then utilized to heat the bar to a temperature that will shrink the shrinkable material to the desired degree and thus apply pressure to the ground insulation compacting it to the same dimension at that of the adjoining slot portion ground insulation. When the ground insulation has been so compacted but without being cured, the heating tapes and outer layers of shrinkable material and the metal plates are removed. The conductor bar is then assembled in the machine, the arms heated to a temperature which will flexibilize the uncured resin, electrical connections made, and the arm ground insulation cured to its final substantially infusible state by any desired heating means. For example, heating tapes may, once again, be butt-lapped over the remaining inner layer of shrinkable material and heat applied for a time sufficient to fully cure the already-compacted arm ground insulation. Normally, after the arm ground insulation is fully cured, the heating tape, as well as the remaining inner layer of shrinkable material and non-adherent material is removed to expose the now hardened ground insulation which, during the final heating process, was protected by the non-adherent layer and the layer of shrinkable material.

It will be realized, of course, that other means of carrying out the process may be used which do not depart from the spirit and scope of this invention. For example, particularly where the bar is rounded and not rectangular in shape, it may be desirable to use only the one or more first layers of shrinkable material to distribute the compacting force, eliminating the need for conforming rigid metal plates. The plates can also be eliminated if desired where the bar is rectangular in some instances. It may also be desired in some cases and not disadvantageous to leave in place the inner or first layers of shrinkable material in which instance the layer of non-adherent material can be dispensed with. Likewise, instead of using heating tapes, it may be advantageous to cure the arm ground insulation or to shrink the shrinkable material in an oven or by means of a heated fluid or otherwise. In some cases, it may even be desirable to let the arm ground insulation cure in situ by means of the heat generated by the electrodynamic machine itself. In this latter variation, it may be desirable to simply place the layers of shrinkable material directly on the arm ground insulation and let it remain in place during the compacting and curing steps and thereafter.

The following example will illustrate the practice of the invention, it being realized that it is exemplary only of the many advantages to be derived therefrom.

Referring to the figures, a conductor bar assembly 1 having conductor bar 2 with portions 3 and 4 was treated to ground insulate the slot portion and a portion of the arm of the bar as at 5 according to Patent 2,707,204, the bare arm portion of the bar being suitably protected with resinous or other tape or an envelope during such insulation. Thereafter, the arm portion of the slot insulation was scarfed as shown at 6 to provide for reception of the arm ground insulation 7 which is applied typically in the form of a tape which conforms to the scarfed area 6. Ground insulation 7 typically consists of supported mica flake or mica mat tape having as a resin impregnant a solventless material such as that described in the above-mentioned Patent 2,962,410. In this particular example the resin consisted of a material comprising by weight 100 parts of Epon 828 which is a polyglycidol ether reaction product of an epihalohydrin, such as epichlorohydrin and bis-(4-hydroxyphenyl)-2, 2-propane, along with 5 parts of tetrabutyl titanate and one part of dimethyl soya amine. It is important that such materials have an epoxy equivalent of from about 175 to 300. Typically, for mica mat tape, the resin constitutes about 45 percent of the weight of the tape and for mica flake tape about 23 percent of the weight of the tape. In this particular example, the ground insulation consisted of one layer of mica mat tape and five layers of mica flake tape impregnated with the above composition. There can also be applied to the scarfed area of the prior insulation and the bare arm a primer consisting of the above resin. Over the insulating tape there can be applied an asbestos grading tape not shown consisting of well-known voltage grading material, such as divided carbon, iron oxide, and the like, it being realized, of course, that such grading tape is used only where indicated by the particular installation.

There is next applied a one-half lapped layer 8 of non-adherent material such as that of a fluorocarbon, it being realized that this layer of tape, as well as all other layers of tape, is carried out over the slot portion of the ground insulation. Over the non-adherent layer there are tightly wrapped one-half lapped layers 9 of polyethylene terephthalate which is about 12 percent post-oriented. As pointed out above, where rectangular conductor bars are used as in this example, steel plates 10, in this case about 0.010 inch thick, are placed along the side of the arm using post-oriented shrinkable material to hold the plates on the bars. These plates are cut from a pattern made from the actual bar and extend the entire length of the bar arm to be insulated. Next, preferably at least eight layers, 11, of 0.002 inch thick shrinkable material as above are applied over the steel plates, it being realized that this thickness will be varied according to the actual installation being treated. Next, over the shrinkable material, a heating tape 12 of suitable capacity was butt-lapped and the bar heated by means of the heating tape to a temperature of about 150° C. in about two hours and held at this temperature for about 15 minutes to shrink the shrinkable material layers to the fullest degree. Asbestos tape 13 or other heat insulating means can be used if desired to contain the heat. As pointed out above, other heating means can be used if desired. At this point, the asbestos tape 13, if used, the heating tape 12, the outer layers of shrinkable material 11 and the steel plates 10 are removed leaving over the arm ground insulation only the inner shrinkable layer and the non-adherent layer which serve to protect the arm ground insulation during installation in the machine. Before assembling the bar in the machine, the wrapped arms are heated to approximately 70° C. for 15 minutes to flexibilize the resin therein and the bars so that they can be readily fitted into position for electrical connection with other bars to form a full coil. When the electrical connections have been made, heating tape or other means are applied to the bare arms to fully cure the now compacted ground insulation thereon. For the resin mentioned above, the temperature is typically raised to 150° C. and held for about 4 hours and then raised to a temperature of 160 to 170° C. and held 2 to 3 hours. After the arm ground insulation has been fully cured, the bar is allowed to cool to room temperature and the heating tape and the inner layer of shrinkable material and non-adherent material removed therefrom to provide a finished, fully insulated conductor bar.

The electrical and physical characteristics of conductor bars insulated according to this invention are very salutary. For example, the compacted but uncured arm portion of the ground insulation was tested for dielectric strength by applying thereto a voltage which was rapidly raised to 5 kv. and then advanced step by step at 5 kv. per minute to 45 kv. and held for one minute without failure. When the fully cured arm ground insulation was so tested the dielectric strength was found to be over 85 kv. and comparable to that of the cured slot portion.

When the arm ground insulation was stressed at 31 kv. at room temperature, no failure had occurred after 2500 hours. At 130° C. and a stress of 13 kv., no failure had occurred after 4000 hours. When a lot of six such bars was hi-potted step-wise 5 kv. per minute to failure, the lowest failure voltage was 50 kv. This performance is equivalent to that of the slot insulation. The power factor of the arm portion was also similar to that of the slot portion.

There is provided, then, by the present invention a method of readily providing ground insulation for the arm or end portions of conductor bars and coils for electrodynamic machines which facilitates installation in the machines, particularly in the case of replacement units which is comparable to that of the slot insulation. It will be appreciated that in some instances it may even be desirable to insulate the entire conductor bar or electrical coil in the same manner as that used for the arm or end portion.

What I claim as new and desire to secure by Letters Patent of the United States is:

1. The process of ground insulating an arm portion of a conductor bar for electrodynamic machines which comprises
    (a) wrapping said arm portion, except for an end contact region, with an insulating tape impregnated with a heat curable, completely reactive resin composition,
    (b) wrapping about said insulating tape a layer of non-adherent material,
    (c) wrapping over said non-adherent material at least one layer of a post-oriented shrinkable material having at least about five precent shrinkage when heated at a temperature of at least 120° C.,
    (d) placing over said shrinkable material and at each side of said bar rigid metal plates which conform to the configuration of said arm,
    (e) wrapping over said plates and bar at least one layer of a shrinkable material as described in (c),
    (f) wrapping over said outer layer of shrinkable material a heating tape,
    (g) passing a current through said heating tape to heat said bar to shrink said shrinkable material of (c), and compact said insulating tape,
    (h) removing the outer layer of shrinkable material and metal plates, and
    (i) applying heat to said bar at a temperature of about 150° C. for a time sufficient to cure the resin therein.

2. The process of ground insulating an arm portion of a conductor bar for an electrodynamic machine which comprises
    (a) wrapping said arm portion, except for an end contact portion, with an insulating tape impregnated with a heat curable, completely reactive resin composition,
    (b) wrapping about said insulating tape a layer of non-adherent material,
    (c) wrapping over said non-adherent material at least one layer of post-oriented, shrinkable tape material having at least about five percent shrinkage when heated at a temperature of at least 120° C.,
    (d) placing over said shrinkable material and at each side of said bar rigid metal pressure applying and distributing means which conform to the configuration of said bar,
    (e) wrapping over said outer layer of shrinkable material a heating tape,
    (f) passing a current through said heating tape to heat said bar to shrink said shrinkable material of (c), and compact said insulating tape,
    (g) removing the outer layer of shrinkable material and metal pressure applying and distributing means,
    (h) heating to flexibilize said arm insulation,
    (i) installing said bar in said machine, and
    (j) heating said bar for a time and at a temperature sufficient to cure the insulation thereon.

3. The process of ground insulating an arm portion of a conductor bar for an electrodynamic machine which comprises
    (a) wrapping said arm portions, except for an end contact region, with an insulating tape impregnated with a heat curable, completely reactive resin composition,
    (b) wrapping about said insulating tape a layer of non-adherent material,
    (c) wrapping over said non-adherent material at least one layer of post-oriented, shrinkable tape material having at least about five percent shrinkage when heated at a temperature of at least 120° C.,
    (d) wrapping over said shrinkable material a heating tape,
    (e) passing a current through said heating tape to heat said bar to shrink said shrinkable material and compact said insulating tape,
    (f) heating to flexibilize said bar insulation,
    (g) installing said bar in said machine, and
    (h) heating said bar for a time and at a temperature sufficient to cure the arm insulation thereon.

4. The process of ground insulating a conductor bar for electrodynamic machines which comprises
    (a) covering the slot portion and a part of the arm portion of said bar with a thermosetting resin impregnated insulating material,
    (b) molding said slot portion under heat and pressure until the insulation is converted to the cured state,
    (c) scarfing the insulation at the arm portion of said bar,
    (d) wrapping said arm portion, except for an end contact region, with an insulating tape, impregnated with a heat curable, completely reactive resin composition, said tape being conformed to said scarf,
    (e) wrapping about said insulating tape a layer of non-adherent material, (f) wrapping over said non-adherent material at least one layer of a post-oriented shrinkable material having at least about five percent shrinkage when heated at a temperature of at least 120° C.,
(g) placing over said shrinkable material and at each side of said bar rigid metal plates which conform to the configuration of said arm,
(h) wrapping over said plates and bar at least one layer of a shrinkable material as described in (f),
(i) wrapping over said outer layer of shrinkable material a heating tape,
(j) passing a current through said heating tape to heat said bar to shrink said shrinkable material, and compact said insulating tape,
(k) removing the outer layer of shrinkable material and metal plates, and
(l) applying heat to said bar at a temperature of about 150° C. for a time sufficient to cure the resin therein.

5. The process of ground insulating a conductor bar for an electrodynamic machine which comprises
(a) covering the slot portion and a part of the arm portion of said bar with a thermosetting resin impregnated insulating material,
(b) molding said slot portion under heat and pressure until the insulation is converted to the cured state,
(c) scarfing the insulation at the arm portion of said bar,
(d) priming the bare arm portion of said bar and the scarfed portion of said insulation with a heat curable, completely reactive resin composition,
(e) wrapping said arm portion, except for an end contact portion, with an insulating tape impregnated with a heat curable, completely reactive resin composition, said tape being conformed to said scarf,
(f) wrapping about said insulating tape a layer of non-adherent material,
(g) wrapping over said non-adherent material at least one layer of post-oriented, shrinkable tape material having at least about five percent shrinkage when heated at a temperature of at least 120° C.,
(h) placing over said shrinkable material and at each side of said bar rigid metal pressure applying and distributing means which conform to the configuration of said bar,
(i) wrapping over said metal means and bar at least one layer of a shrinkable material as described in (f),
(j) wrapping over said outer layer of shrinkable material a heating tape,
(k) passing a current through said heating tape to heat said bar to shrink said shrinkable material, and compact said insulating tape,
(l) removing the outer layer of shrinkable material and metal pressure applying and distributing means,
(m) heating to flexibilize said arm insulation,
(n) installing said bar in said machine, and
(o) heating said bar for a time and at a temperature sufficient to cure the insulation thereon.

6. The process of ground insulating a conductor bar for an electrodynamic machine which comprises
(a) covering the slot portion and a part of the arm portion of said bar with a thermosetting resin impregnated insulating material,
(b) molding said slot portion under heat and pressure until the insulation is converted to the cured state,
(c) scarfing the insulation at the arm portion of said bar,
(d) wrapping said arm portion, except for an end contact region, with an insulating tape impregnated with a heat curable, completely reactive resin composition, said tape being conformed to said scarf,
(e) wrapping about said insulating tape a layer of non-adherent material,
(f) wrapping over said non-adherent material at least one layer of post-oriented, shrinkable tape material having at least about five percent shrinkage when heated at a temperature of at least 120° C.,
(g) placing over said shrinkable material and at each side of said bar rigid metal plates which conform to the configuration of said bar,
(h) wrapping over said plates and bar at least one layer of a shrinkable material as described in (f),
(i) wrapping over said outer layer of shrinkable material a heating tape,
(j) passing a current through said heating tape to heat said bar to shrink said shrinkable material, and compact said insulating tape,
(k) removing the outer layer of shrinkable material and metal plates,
(l) heating to flexibilize said arm insulation,
(m) installing said bar in said machine, and
(n) heating said bar for a time and at a temperature sufficient to cure the insulation thereon.

7. The process of ground insulating a conductor bar for an electrodynamic machine which comprises
(a) covering the slot portion and a part of the arm portion of said bar with a thermosetting resin impregnated insulating material,
(b) molding said slot portion under heat and pressure until the insulation is converted to the cured state,
(c) scarfing the insulation at the arm portion of said bar,
(d) priming the bare arm portion and scarfed area of said insulation with a heat curable, completely reactive resin composition,
(e) wrapping said arm portion, except for an end contact portion, with an insulating tape impregnated with a heat curable, completely reactive resin composition, said tape being conformed to said scarf, and
(f) wrapping about said insulating tape a layer of non-adherent material,
(g) wrapping over said non-adherent material at least one layer of post-oriented, shrinkable tape material having at least about five percent shrinkage when heated at a temperature of at least 120° C.,
(h) heating said shrinkable tape to shrink it and compact said insulating tape,
(i) heating to flexibilize said arm insulation,
(j) installing said bar in said machine, and
(k) curing the insulation on the arm portion of said bar.

8. The process of ground insulating a conductor bar for an electrodynamic machine which comprises
(a) covering the slot portion and a part of the arm portion of said bar with a thermosetting resin impregnated insulating material,
(b) molding said slot portion under heat and pressure until the insulation is converted to the cured state,
(c) scarfing the insulation at the arm portion of said bar,
(d) wrapping said arm portion, except for an end contact region, with an insulating tape impregnated with a heat curable, completely reactive resin composition, said tape being conformed to said scarf,
(e) wrapping about said insulating tape a layer of non-adherent material,
(f) wrapping over said non-adherent material at least one layer of post-oriented, shrinkable tape material having at least about five percent shrinkage when heated at a temperature of at least 120° C.,
(g) wrapping over said shrinkable material a heating tape,
(h) passing a current through said heating tape to heat said bar to shrink said shrinkable material and compact said insulating tape,
(i) heating to flexibilize said bar insulation,
(j) installing said bar in said machine, and
(k) heating said bar for a time and at a temperature sufficient to cure the arm insulation thereon.

9. The process of ground insulating a conductor bar for an electrodynamic machine which comprises
(a) covering the slot portion and a part of the arm portion of said bar with a thermosetting resin impregnated insulating material,
(b) molding said slot portion under heat and pressure until the insulation is converted to the cured state,
(c) scarfing the insulation at the arm portion of said bar,
(d) wrapping said arm portion, except for an end contact region, with an insulating tape impregnated with a heat curable, completely reactive resin composition, said tape being conformed to said scarf,
(e) wrapping about said insulating tape a layer of non-adherent material,
(f) wrapping over said non-adherent material at least one layer of post-oriented, shrinkable tape material having at least about five percent shrinkage when heated at a temperature of at least 120° C.,
(g) heating said shrinkable tape to shrink it and compact said insulating tape,
(h) heating to flexibilize said arm insulation,
(i) installing said bar in said machine, and
(j) curing the insulation on the arm portion of said bar.

10. The process of ground insulating a conductor bar for an electrodynamic machine which comprises
(a) covering the slot portion and a part of the arm portion of said bar with a thermosetting resin impregnated insulating material,
(b) molding said slot portion under heat and pressure until the insulation is converted to the cured state,
(c) scarfing the insulation at the arm portion of said bar,
(d) wrapping said arm portion, except for an end contact region, with an insulating tape impregnated with a heat curable, completely reactive resin composition, said tape being conformed to said scarf,
(e) wrapping over said tape at least one layer of a post-oriented, shrinkable tape material having at least about five percent shrinkage at elevated temperatures,
(f) heating said bar to shrink said shrinkable material and compact the arm portion insulating tape, and
(g) heating said bar to cure said arm insulation.

11. The process of ground insulating a conductor bar for an electrodynamic machine which comprises
(a) covering the slot portion and a part of the arm portion of said bar with a thermosetting resin impregnated insulating material,
(b) molding said slot portion under heat and pressure until the insulation is converted to the cured state,
(c) scarfing the insulation at the arm portion of said bar,
(d) wrapping said arm portion, except for an end contact region, with an insulating tape impregnated with a heat curable, completely reactive resin composition, said tape being conformed to said scarf,
(e) wrapping over said insulation at least one layer of post-oriented, shrinkable tape material having at least about five percent shrinkage when heated at a temperature of at least 120° C., heating said shrinkable tape material to shrink it and compact said insulating tape,
(f) inserting the slot portion of said bar in said machine, heating the arm portion of said bar to flexibilize the arm insulation,
(g) connecting said bar in place, and
(h) heating said arm insulation for a time and at a temperature sufficient to cure the insulation.

References Cited by the Examiner
UNITED STATES PATENTS

| | | | |
|---|---|---|---|
| 2,928,964 | 3/1960 | Jones | 156—185 X |
| 2,993,820 | 7/1961 | Marshall | 156—56 |
| 3,048,651 | 8/1962 | Howard et al. | 156—56 X |
| 3,079,519 | 2/1963 | Kitson et al. | 156—56 X |

EARL M. BERGERT, *Primary Examiner.*

P. R. WYLIE, J. MATHEWS, *Assistant Examiners.*